United States Patent [19]

Martin

[11] Patent Number: 4,858,156

[45] Date of Patent: Aug. 15, 1989

[54] APPARATUS FOR EXAMINING OBJECTS

[75] Inventor: Michael S. Martin, Royston, England

[73] Assignee: Soudronic AG, Bergdietikon, Switzerland

[21] Appl. No.: 854,604

[22] Filed: Apr. 22, 1986

[30] Foreign Application Priority Data

May 22, 1985 [GB] United Kingdom ............... 8512979

[51] Int. Cl.⁴ ............................................. B07C 5/00
[52] U.S. Cl. ................................... 364/560; 358/106; 356/240; 209/524
[58] Field of Search ............... 364/550, 552, 560, 468, 364/551.01, 478, 507, 561, 564; 356/384–386, 241, 240; 198/502.2, 339.1; 72/6, 12; 358/107, 106, 101; 901/47; 209/576, 577, 597, 524, 525; 382/25; 250/233 B

[56] References Cited

U.S. PATENT DOCUMENTS

| 4,115,803 | 9/1978 | Morton | 358/107 |
| 4,302,773 | 11/1981 | Yoshida | 358/106 |
| 4,493,105 | 1/1985 | Beall et al. | 358/107 |
| 4,549,205 | 10/1985 | Misaki et al. | 358/106 |
| 4,581,632 | 4/1986 | Davis et al. | 358/106 |
| 4,608,709 | 8/1986 | Hedler et al. | 382/25 |
| 4,644,583 | 2/1987 | Watanabe et al. | 358/107 |
| 4,735,323 | 4/1988 | Okada et al. | 358/106 |
| 4,775,889 | 10/1988 | Yoshida | 358/106 |
| 4,811,251 | 3/1989 | Minato | 364/552 |

FOREIGN PATENT DOCUMENTS 2180932 4/1987 United Kingdom ............... 209/524

Primary Examiner—Parshotam S. Lall
Assistant Examiner—S. A. Melnick
Attorney, Agent, or Firm—McCormick, Paulding & Huber

[57] ABSTRACT

Apparatus for examining the shape and/or dimensions of an object wherein an object is fed to a test station (12) on a stepping conveyor (14), the object is illuminated within the test station and scanned by two linear charge-coupled camera devices (18, 20) acting in mutually perpendicular directions across and along the conveyor. Logic circuitry processes the video signals to provide raw measurement signals fed into a microprocessor for analyzing the signals and for providing control signals for a downstream reject mechanism.

14 Claims, 3 Drawing Sheets

APPARATUS FOR EXAMINING OBJECTS

FIELD OF THE INVENTION

This invention relates to apparatus for examining the shape or dimensions of objects.

BACKGROUND TO THE INVENTION

In the food canning industry empty cans are loaded onto a conveyor which transports them to a filling system.

If a can is deformed, it may jam the filling system and/or cause damage to the latter. Thus, in the case of nominally round cans, it is desirable to check that cans with an ovality deformation do not pass to the filling system.

Another common fault present in cans is dinting, i.e. a deformation of the can lip. Excessive dinting can also create problems if the can passes to the filling system, in particular because the can may then not seal correctly.

While the present invention is especially suited to the pre-examination of cans, especially round cans used in food canning, it is not limited thereto, and may find application in the final testing of filled and sealed cans, e.g. for dents, and in testing other objects altogether such as bottled and shaped packages.

THE INVENTION

In accordance with the invention, apparatus for examining the shape and/or dimensions of objects comprises a test station adapted for location on the path of a means for conveying the objects through said test station, electronic camera means at the test station for scanning the presented face of the object at least in a direction transverse to its direction of movement, the or each camera providing an output signal, means for processing the camera output signal(s) to provide respective measurement signals representative of the shape and/or dimensions of the object, and comparator means for comparing the respective measurement signals with reference data signals, the apparatus also having an input indicative of the speed of movement of the conveyor.

In a preferred arrangement, a camera scanning in the direction of movement of the conveyor provides the input relating to the conveyor speed. However, this camera may also provide measurement signals relating to object shape and/or dimensions.

Preferably, therefore, the object is scanned in one direction parallel to the direction of conveyance, the transverse direction being at right angles thereto.

In one arrangement a single two dimensional camera may scan the object in both directions.

In another arrangement two one-dimensional cameras may respectively scan the object in two perpendicular directions.

Alternatively, means may be provided on the conveying system for turning the object through an angle (typically a right angle) as its passes through the test station, so that a single one-dimensional camera is able successively to scan the object in the two directions.

The conveying means may operate to feed the objects through the test station continuously or semi-continuously (objects touching or more preferably spaced), preferably the latter.

Where two one-dimensional (linear) cameras are employed, the first camera is able to detect the motion of the object and provide scan synchronisation for the second camera.

While the camera means preferably comprises one or more charge-coupled devices, it is alternatively possible to employ other types of camera, such as the linear photodiode array type.

The comparator means preferably provides an output signal indicative of whether or not the shape and/or dimensions of the object comply with preset limits. Such output signal may, for example, operate an alarm device or a conveyor step device or an object reject mechanism.

Preferred processing circuitry for the camera output signal(s) comprises means providing a first measurement pulse representing the leading edge (in the direction of scan) of the object and a second measurement pulse representing the trailing edge thereof. The spacing between these pulses, if necessary corrected for object movement during the scanning period, can provide a measurement of the object size in one direction. The other camera signal (again corrected for movement if necessary) is able to provide a measurement of object size in a transverse direction. Thus, in the case of a can for example, two diameter measurements at right angles may be obtained, and a comparison between the two provides a measurement of simple ovality. Analogous processing of the video-type signals obtained from the camera means may provide measurements of the width of the rim of the can at differing points around its circumference, thereby enabling the can to be tested for dinting. Other blemishes and deformations in objects can be similarly detected and evaluated.

For reliable and repeatable detection and measurement, it is important to ensure that the output signals from the camera means show substantial variations in amplitude as features of the object are scanned. Preferably, therefore, the test station includes means for effecting substantially uniform illumination of the face of the object presented to the camera means.

In a preferred apparatus, the comparator means is incorporated in a computer, dedicated or suitably programmed, wherein the reference data signals are stored, preferably with means for user adjustment and variation thereof. Such a computer is able to further process raw data (measurement signals) received from the primary processing circuitry, analyze and compare the signals obtained during and subsequent to processing, for example using both reference data and algorithms, before providing an output signal to control a device such as a reject mechanism.

Moreover, it is within the compass of the invention also to develop the measurement signals within the computer, which in this instance would receive a digitised video signal output by feeding the output signals from the camera means through an analog-to-digital converter.

BRIEF DESCRIPTION OF DRAWINGS

The invention will now be exemplified with reference to the accompanying drawings, in which.

DESCRIPTION OF EMBODIMENT

Figure 1:
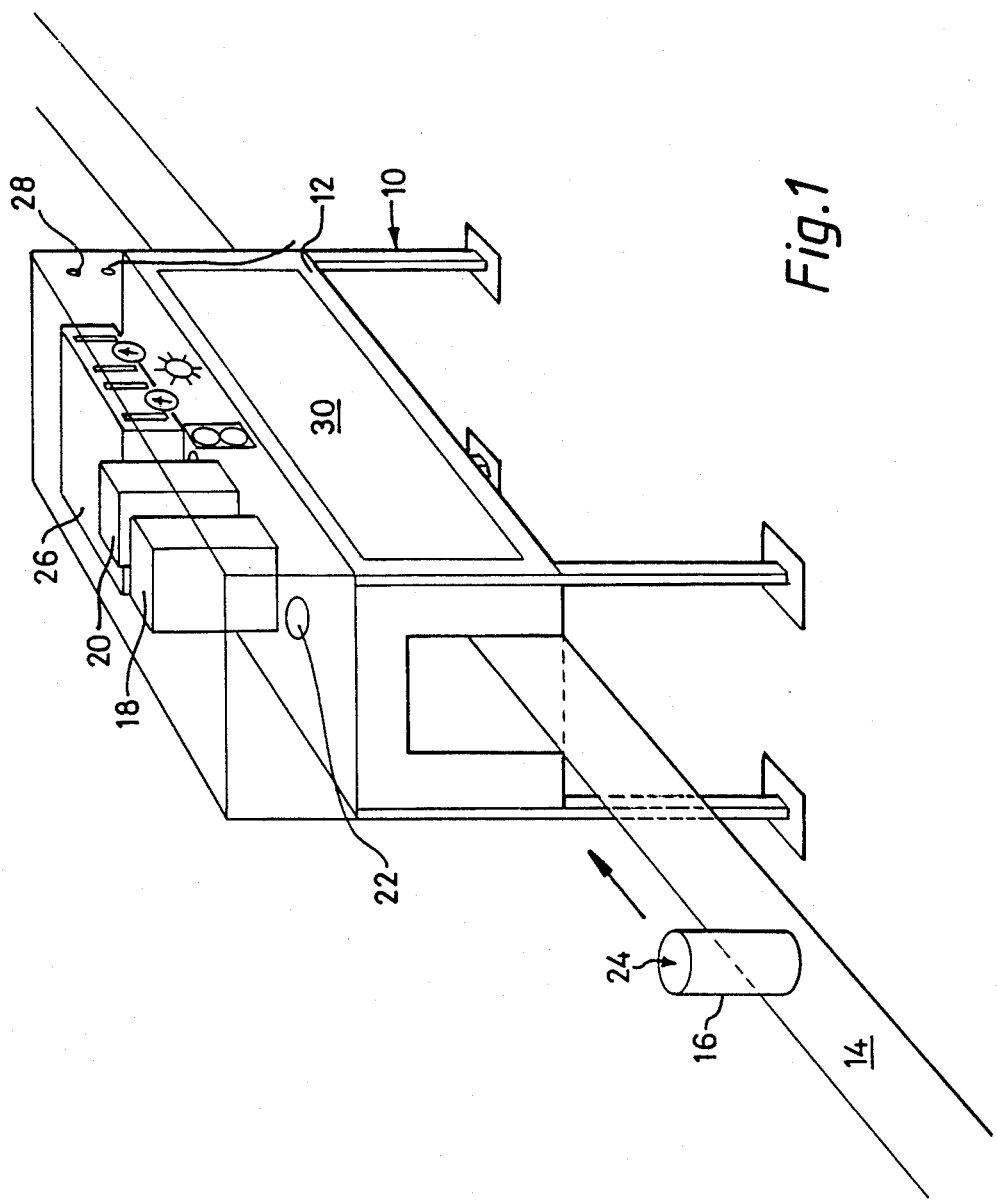
FIG. 1 diagrammatically illustrates an object-testing apparatus in accordance with the invention.

Referring to FIG. 1, the apparatus of the invention includes a support 10 carrying an enclosure 12 and adapted to straddle a conveyor 14 on which cans 16 are being conveyed, e.g. empty cans in transport to a filling and sealing system.

On the enclosure 12 are mounted two linear CCD cameras 18, 20, together with a light source 22 which may be a diffused multiple tungsten lamp, fluorescent lamp or laser source such as a helium-neon laser providing a plane of light through a cylindrical lens. The cameras 18, 20 are supported vertically above the path of the moving cans to be tested, which path passes through the enclosure 12, so as to view the upper nominally round face 24 thereof which is illuminated by the light source 22. One camera is aligned with the can direction on and along the locus of movement of the centre of the face 24; the other camera is aligned at right angles thereto, taking successive measurements normal to the direction of motion as the can passes underneath.

Also shown in the drawing are an electronic control box 26 housig primary logic circuitry and microcomputer, with access via an electronics control panel 28. The enclosure 12 also has a removable inspection panel 30 to enable cans passing through the test station to be visually inspected, and also to enable insertion of test pieces for alignment and calibration purposes.

The first camera 18 provides, for example, a measurement of the maximum width (diameter) of the can from edge to edge, and of the width of the edge rim at both the leading and trailing edges. In addition, the relative motion of the can as detected by this first camera is used to provide scan synchronisation for the second camera 20.

The electronic control circuitry 26, later described, includes a timing clock to control camera operation and data processing, if desired accompanied by data read-out to a data logger. A line scan synchronising signal is provided to indicate the start of a new line.

The camera video signals are digitised with respect to the set level of a discriminator, and the digitised signals are processed and the measurement signals analysed by the computer.

In order to ensure reliability and repeatability of the measurements, the source 22 is driven by a d.c. power supply (not shown) in order to achieve a constant and uniform illumination of the face of the can viewed by the cameras.

Downstream of the test station, an ejector mechanism (not shown) is controlled by a signal derived from the computer to reject cans not meeting set standards of shape and dimension which are pre-set in or programmed into the computer.

Figure 2:
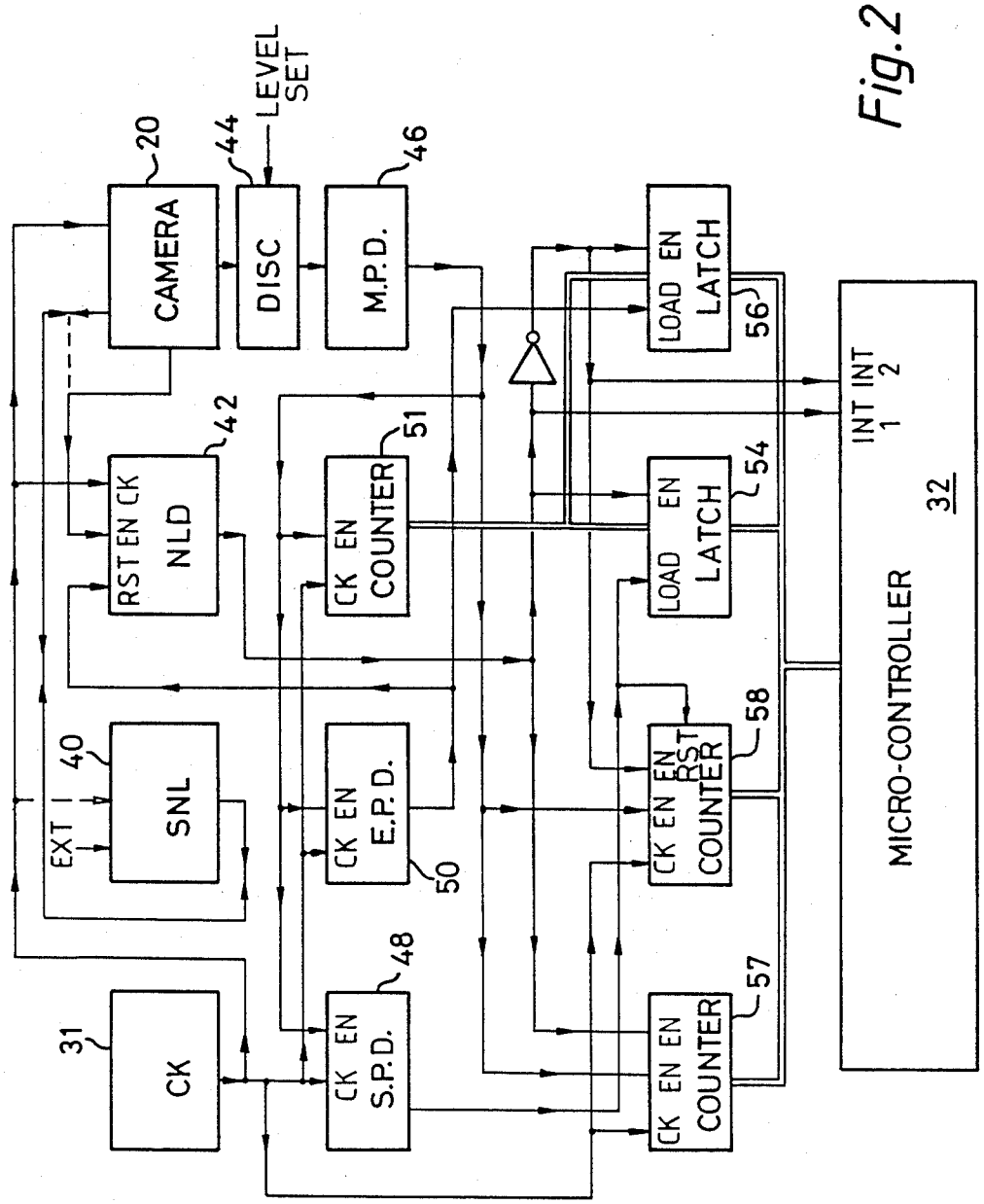
FIG. 2 is a block circuit diagram.

Referring now to FIG. 2, the control electronics include a clock 31 providing for generation of control signals within the CCD camera 20, which scans perpendicular to the line of the conveyor. Generally analogous circuitry associated with the same microcomputer 32 may exist for the camera 18. The interface between the camera 20 and the computer 32 comprises, in addition to the clock 30, integrated circuit logic which will now be described.

A start-new-line signal (SNL) is generated either by an external control (e.g. another camera such as camera 18) or by the computer or again the camera may be free-running as a sub-multiple of the scan clock. The SNL generator 40 (or the control signals generator in the camera) set the new-line-detected latch (NLD) 42. The video signal from the camera 20 is converted to a digital signal in the discriminator (disc) 44 by comparison with a pre-set reference signal. The digitised signal is checked for missing or marginal pulses by the missing-pulse-detector (MPD) 46, and provides an enable signal indicating an edge or other feature of interest on the can. The leading edge of the MPD signal sets the start-pulse-detector latch (SPD) 48 and the trailing edge sets the end-pulse-detector latch (EPD) 50. The new-line-detector 42 set by the SNL 40 indicates the start of a new scan line and is reset by the EPD 50 at the end of the first detected edge. Counter 51 is reset to zero by the leading edge of the NLD 42 and thereafter counts the CCD camera diode scan position for that line via the connection to CK. The contents of the counter are transferred to latch 54 by the SPD latch 48 in conjunction with the NLD latch 42, thereby transferring the leading-edge coordinate of the can. Thereafter with the NLD latch reset, the EPD latch 50 transfers successive trailing edge coordinates to latch 56 until, at the end of the line scan, latch 56 contains the coordinate of the far edge of the can. Similarly counters 57 and 58 contain the width of the first and last edges of the can detected. Both counters are enabled by the MPD 46 and count clock pulses while the MPD is active. Counter 57 counts the width of the leading edge while the NLD is active while counter 58 counts successive events when the NLD is reset, until the far edge width remains at the end of the scan line: each succesive event in the line causes counter 58 to be reset by the SPD latch 48, although only the first and last events in the line are associated with useful data, inbetween events generally being spurious. In the event of a single edge being detected counter 58 will contain zero.

Data is transferred to the microcomputer 32 under control of the NLD latch 42. When the NLD 42 resets, an interrupt indicates that data in the latch 54 and counter 51 are ready for transfer. At the end of the scan line, or when NLD 42 goes active in the following scan line, another interrupt indicates that data in the latch 56 and counter 58 are ready for transfer. In the event of a single edge being detected the only interrupt will be at the end of the scan-line; if the contents of latch 54 is zero no edge has been detected.

Figure 3:
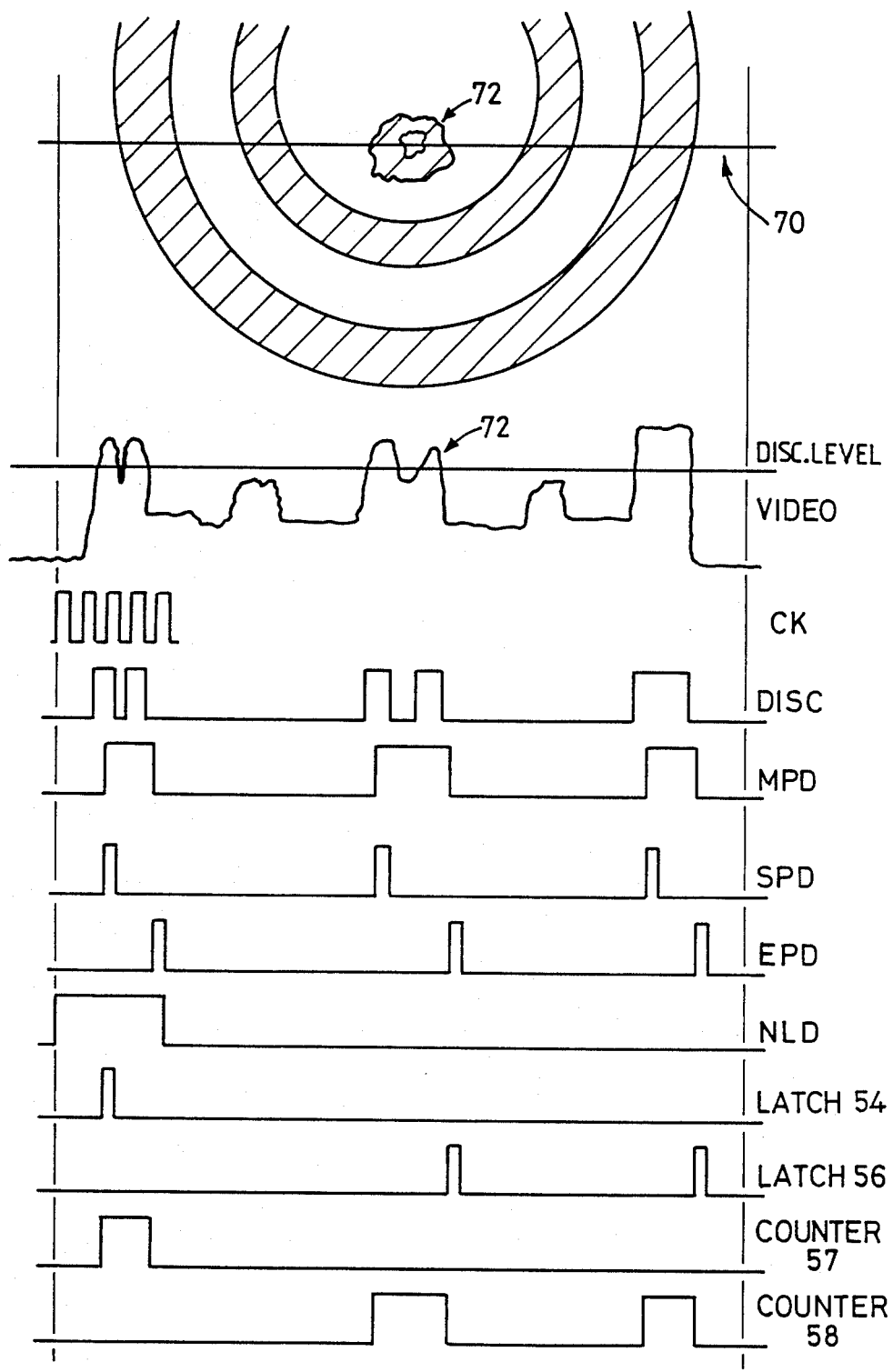
FIG. 3 comprises a set of signal waveforms.

Referring now to FIG. 3, the upper part of the illustration indicates a line scan 70 across a can top having a blemish 72 and the waveforms below indicate the resulting signals generated at the various logic circuit components above described with reference to FIG. 2. Each waveform is marked to indicate the relevant component to which it relates. The measurement signals generated are: (a) the leading edge position in latch 54; (b) the trailing edge position in latch 56; (c) the width of rim at the leading edge in counter 57; (d) the widths of blemish and rim at the trailing edge in counter 58.

The computer 32 has stored therein reference values which set the limits for acceptance of the can with respect to distortions in shape and dimensional variations. If the measurement signals fail to meet the set limits, a can ejector device may be automatically operated under computer control.

The preceding description relates to detection of simple ovality and dinting. However, it will be appreciated that there can be two cameras (or a two dimensional camera or other equivalent) scanning the can in mutually transverse directions and that, during passage through the test station, a large plurality of scans are able to provide a large number or measurement signals to the computer. The computer may be preset or programmed to process these signal cumulatively, and evaluate the shape and dimensions of the can more precisely as to errors in shape and dimensions, for example having regard to algorithms stored in its memory.

Thus, errors in the edge rim of the can may be detected by (a) comparing the width of the rim at the leading and trailing edges; (b) comparing change in rim widths between successive parallel scans; (c) integrating the rim width measurements over an arc around the can and effecting a comparison of the integrated values. Analogously, by monitoring the change in the leading and trailing edge positions through successive scans, it is possible to check for complex ovalities and other distortions from roundness which do not appear from a simple comparison of maximum diameters in two coordinate directions. In general, ovality can be checked by: (a) comparing diameters in mutually perpendicular directions as above mentioned; (b) checking that the maximum diameter is at the centre point of the perpendicular axis; (c) checking that the median of the can, as measured on the appropriate axis, has a constant position.

More generally, the above-described apparatus, incorporating a suitably dedicated or programmed computer, is capable of:

(a) determining deformation of an object by comparing maximum measurements in two perpendicular axes using two line-scan cameras, while items are in continuous motion on a conveyor;

(b) detecting deformation in an item which is symmetrical about the axis of motion, by measuring the width perpendicular to the axis of motion, determining the median of the object by determining the position of the two outside edges for successive scans and hence deviation of the median with respect to the axis of motion;

(c) detecting ovality of an object presenting a round face to the scanning cameras;

(d) determining width of edge(s) of object by scanning in one direction, memorising the width of the leading edge, then memorising width of successive events, resetting the width of each event on the detection of another feature until, at the end of the scan, the last event represents the width of the trailing edge;

(e) having determined succession of edge widths of an item, being able to compute deviations in the uniformity of the total edge surface for the whole item;

(f) using the scan in the axis parallel to the axis of motion to provide equal spaced scans in the other axis perpendicular to the axis of motion, thereby allowing intermittent or variable speed of the item along the conveyor;

(g) examining roung items (in particular cans) for ovality;

(h) examining lipped items (in particular cans) for deformation of the lip.

A possible modification, in connection with features (g) above, is that of using two cameras scanning in parallel, one for detecting the beginning and one the end of a can rim.

I claim:

1. An apparatus for examining objects each having an elliptical cross sectional face extending in a plane and bounded by a perimeter rim, said apparatus comprising:
   a test station adapted for location on the path of a means for conveying the objects in a direction through said test station;
   a means providing signals indicative of the conveying means speed of object conveyance;
   a means for illuminating said object face with electromagnetic radiation;
   electronic camera means at the test station for generating a plurality of electromagnetic scans of said object face presented thereto at least in a direction transverse to the conveying direction of the object, said camera means providing output signals associated with said electromagnetic scans;
   means for processing the camera output signals including
   a means for detecting signals corresponding to leading and trailing edges of object rim first and second sections displaced from one another in a direction approximately parallel to said conveying direction,
   a means for detecting signals corresponding to leading and trailing edges of object rim third and fourth sections displaced from one another in a direction approximately perpendicular to said conveying direction,
   a computation means receiving and said scanned object rim signals for computing magnitudes of displacement between selected ones of said leading and trailing object rim section signals in accordance with said conveyor means speed signals, and computing from said displacement magnitudes signals indicative of the magnitude of ellipticity of said object face; and
   comparator means for comparing the computed object face ellipticity signals with reference data signals indicative of a preferred magnitude thereof and determining therefrom whether each object complies with preset limits.

2. The apparatus according to claim 1 wherein said camera means further scans in the direction of conveyor movement to provide said conveyor means speed signals.

3. The apparatus according to claim 2 wherein said camera means comprises a single camera scanning in two perpendicular directions.

4. The apparatus according to claim 2 wherein said camera means comprises linear first and second cameras respectively scanning in two perpendicular directions.

5. The apparatus according to claim 4 wherein said first camera further provides synchronization signals for the second camera.

6. The apparatus according to claim 4, wherein said computation means further comprises a means for determining a value of rim width from one of said object rim sections leading and trailing edge signals, and wherein said comparator means further coprises a means for comparing the measured value of rim width with reference data signals therefor and determining therefrom whether said object complies with preset limits for said object rim width.

7. Apparatus according to claim wherein said computation means further comprises a means for determining values of rim width from associated leading and trailing signal portions of object rim first and second sections measured during a single scan and comparing said measured rim width values with one another determining therefrom whether the object complies with preset limits for said object rim width.

8. The apparatus according to claim 6, wherein said computation means further comprises a means for integrating signal magnitudes corresponding to a plurality of adjacent measured object rim widths obtained during successive scans of said object.

9. The apparatus according to claim 1, including means on the conveyor for turning the object through an angle, the camera means comprising a camera which scans the object in the same scanning direction both before and after it has been turned.

10. The apparatus according to claim 1 wherein the conveying means acts intermittently to step a succession of spaced objects forward to the test station.

11. The apparatus according to claim 1 wherein the camera means comprises at least one charge-coupled camera device.

12. The apparatus according to claim 1 wherein said comparator means further comprises an alarm device, a conveyor stop device and an object reject mechanism.

13. The apparatus according to claim 1 wherein the comparator means further comprises a microprocessor.

14. The apparatus according to claim 1 further comprising a microprocessor for processing signals received from the camera means via an analog to digital converter.

* * * * *